Figure 1:
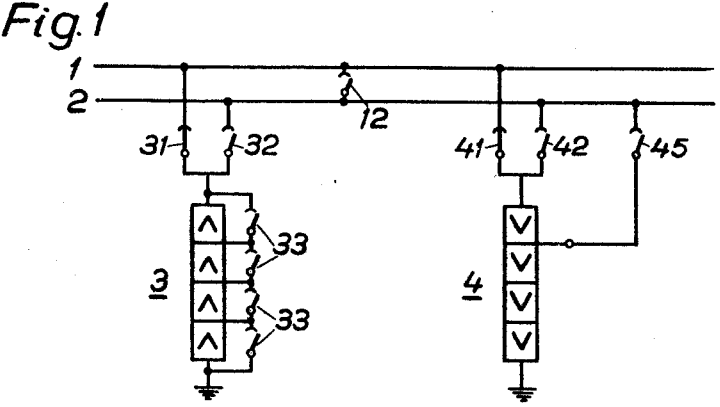

INVENTORS
GUNNAR ENGSTRÖM
HANS STACKEGÅRD
BY Bailey, Stephens &
Huettig

United States Patent Office 3,499,166
Patented Mar. 3, 1970

3,499,166
DIRECT CURRENT TRANSMISSION WITH
PARALLEL TRANSMISSION LINES
Gunnar Engström and Hans Stackegard, Ludvika, Sweden, assignors to Allmanna Svenska Elektriska Aktiebolaget Vasteras, Sweden, a Swedish corporation
Filed Apr. 5, 1965, Ser. No. 445,424
Claims priority, application Sweden, Apr. 20, 1964, 4,817/64
Int. Cl. H02j 1/00
U.S. Cl. 307—24    1 Claim The present invention refers to a D.C. transmission preferably for high voltage, comprising a number of parallel working converter stations each comprising a number of converters which in their turn are provided with a by-pass connection device. Further the D.C. transmission consists of at least two parallel transmission lines each having a return connection with devices for mutual parallel connection of these.

By parallel working converter stations in this context we mean that the converter stations are connected in parallel between the D.C. poles of the transmission, one of which one can constitute an earth connection.

In order to obtain good balance at a desired current or power distribution between the different converters, each converter station is suitably provided with a current regulator in which a desired current is set beforehand in such a way that the sum of current settings in all the parallel rectifier stations rises above the sum of the current settings in all the parallel inverter stations by a certain amount, the so-called current margin. Said current settings can be made as direct current settings or indirectly as a function of the desired effect, frequency or another transmission magnitude. Each converter station tends in this way to adjust its control angle and thereby its voltage to such a value that the current of the station corresponds to the predetermined set value. The converter station whose maximum EMF is smallest will increase its voltage against maximum EMF, but in spite of this the real current of the station will either be less than or exceed the current setting of the station by an amount corresponding to the current margin, depending on whether this converter station works as a rectifier or an inverter respectively. At the same time this station will determine the direct voltage of the transmission since the remaining stations will adjust their voltage in relation to said station in order to obtain the correct operating current. The converter station which determines the voltage will thus carry less current than preset in case of rectifier operation and more current than preset in its current regulator in case of inverter operation.

If for some reason in a converter station in a plant of the type described, one of the converters in the station is by-pass connected, either the whole station in question must be disconnected or the whole transmission voltage must be reduced to a level corresponding to the voltage over the faulty station. In both cases a considerable limitation in the capacity of the transmission is the consequence.

In parallel working transmission lines it is proposed according to the invention to limit such a reduction in the transmission capacity by reducing the transmission voltage on only one of the parallel working transmission lines while the remaining line or lines continues to operate at normal full voltage. According to the invention it is proposed to carry this out in such a way that each converter station is provided with connecting means to each of the transmission lines and that during normal operation all the converter stations are connected to one of the parallel connected transmission lines and that upon by-pass connection of a converter in a station, the corresponding by-pass connecting device is provided with an auxiliary contact arranged to switch the proper converter station over to another transmission line through a corresponding connecting device which in its turn opens the connecting device which connects the converter station to the first transmission line. The latter connecting device is then arranged so that in its opening operation it orders the opening of the device for parallel connection of the two transmission lines.

A transmission system according to the invention will thus in case of a by-pass connection of a converter in a station function in such a way that in the first place the whole transmission voltage is reduced, after which the recently described switching over takes place, after which the other converters connected to the first line by themselves increase their voltage to the normal voltage on account of the current margin setting in the control device of these converters. In this way a switching over according to the invention can be carried out without any interruption in the transmission.

Simultaneously with switching over of any converter station to a separate transmission line which will then operate with reduced voltage, another converter station of opposite category to the faulty one must be switched over to this transmission line. Thus according to the invention upon a fault in a valve group one rectifier and one inverter will operate with reduced voltage on one of the transmission lines, while the remaining transmission continues to operate at normal voltage. The reduction in the capacity of the transmission will thus according to the invention be limited to the smallest possible amount. Suitably it is predetermined which pair of converter stations will operate together upon a fault.

Immediately this seems to require that the invention can only be utilised for a transmission comprising at least four converter stations. This is however not absolutely necessary. If one of the converter stations is provided with an output between two converters, this output has a reduced voltage which can be connected to the transmission line which operates with reduced voltage. In this way for example a rectifier which feeds two inverters can upon a by-pass connection in one of these through an output feed such a damaged inverter with reduced voltage from one transmission line while the second inverter is fed with full voltage from the other transmission line.

Further, the different connecting and parallel connecting devices suitably are formed like power isolators, so that each device at the beginning of its switching movement can give orders to the subsequent devices, thereby enabling a switch-over to be performed very quickly and so that the one device need not to delay its operation until the previous device in the switching sequence has finally carried out its operation. Further, these different isolator switches should be provided with indicators which upon occurrence of an arc in a fully open isolator switch influence the current setting of the converters in a downward direction. Upon such a current reduction the arcs will sooner or later be extinguished, atfer which the different converters in the new position can freely regulate their current up to the normal preset value. All the switchovers according to the invention can therefore be carried out during a temporary voltage reduction without interruption in the operation.

The invention may be utilised in single pole as well as in two pole transmissions. For two pole transmissions the parallel connecting means for the two poles of the transmission are suitably arranged independent of each other and provided with devices for so-called positioning, i.e. devices which prepare the parallel connection device in question for a possible connection. These positioning devices are controlled by the by-pass connection means for the converters which are connected to respective poles so that upon a by-pass connection of converter only the parallel connection device for the pole to which the converter in question is connected is affected. Upon the subsequent switch over of the faulty converter station from the one transmission line to one connected in parallel thereto, an opening order is given to the parallel connection devices for both the transmission lines, but only the parallel connection devices which have been affected will open. In this way a voltage reduction is only carried out for the pole to which the by-passed converter is connected.

Figure 2:
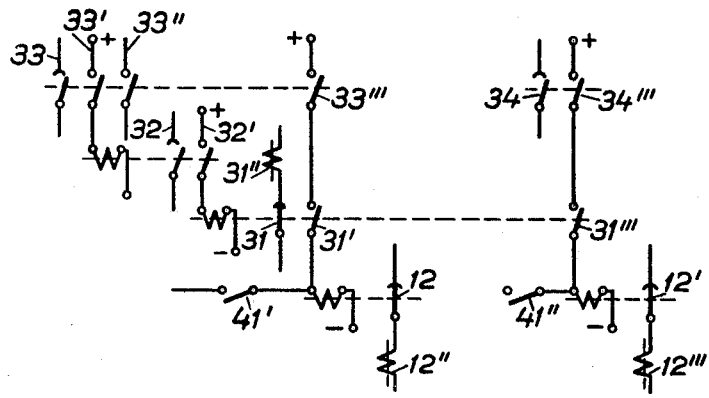

The invention is more fully described with reference to the accompanying drawings, where FIG. 1 shows a one-pole transmission line with earth return conductor and two parallel single conductors, while FIG. 3 shows a two-pole transmission line. FIG. 2 shows connection of the different connection devices.

FIG. 1 shows a part of a rectifier transmission comprising two parallel transmission conductors 1 and 2 and a number of parallel connected converter stations, of which only two, 3 and 4 each comprising four series connected converters, have been shown. Both the transmission lines 1 and 2 are connected with a parallel connection device in the form of an isolator switch 12. Both the converter stations are connected at their one poles to earth and during normal operation are connected with their second poles to the conductor 1 by isolator switch 31, 41 and 51 respectively. Further each station can by means of isolator switches 32, 42 and 52 respectively be connected to the transmission line 2. For the converters in the station 3, by-pass connection devices 33 are also shown in the form of isolating switches for each one of the four converters. Similar by-pass connection devices are found in the remaining converter stations.

The connecting of the different connection devices in FIG. 1 is clear from FIG. 2 where at the top a by-pass connection device 33 is shown provided with two auxiliary contacts 33' and 33". If the isolator switch 33 is closed, the auxiliary contact 33' will also be closed, so that the converter involved is short-circuited and made inoperative and thereby cause the closing of the isolator switch 32 which connects the converter station 3 to the conductor 2. At the same time an auxiliary contact 32' is closed which will cause the opening of the isolator switch 31, and the station 3 will be disconnected from the line 1. At the same time an auxiliary contact 31' is closed which causes the opening of the isolator switch 12, and the parallel connection of both the conductors 1 and 2 is broken. The converter station 3 is then completely disconnected from line 1.

If therefore in a converter in the converter station 3 the corresponding by-pass connection device 33 is closed, the D.C. voltage across the station 3 is thereby reduced. In order to maintain their preset current, the different remaining stations in the transmission will reduce their voltage. At the same time the switchover process described in FIG. 2 will take place and the converter station 3 will thereafter operate on the transmission line 2 which is then disconnected from the transmission line 1. If the station 3 for example operates as a rectifier, one of the inverters of the transmission must also be switched over to the conductor 2. For this reason the by-pass connecting device 33 is provided with an auxiliary contact 33" which orders a pre-determined inverter in the transmission to be switched over from the line 1 to the line 2. Both these converter stations will therefore co-operate with reduced voltage on the line 2. The remaining stations in the transmission will operate on the line 1 and when the station 3 with its reduced voltage has been disconnected from the line 1 said stations increase their voltage to normal on account of the current margin adjustment. The converter station which has the smallest maximum EMF will increase its voltage in order to reach its preset current. The remaining stations follow and the process continues until normal transmission voltage has been reached.

For the converter stations which co-operate on the transmission line 2, the current settings should in a similar way be co-ordinated so that a certain current margin is secured. In order to attain suitable co-ordination of the current settings and to predetermine which converter station on each occasion should co-operate, the circuit should suitably be provided with some form of main system which in a known way makes necessary calculations and gives suitable control programme.

Instead of reducing the voltage on a fault free converter station in order to utilise a converter station with reduced voltage some of the stations can be provided with an intermediate output between two of the converters as is suggested in FIG. 1. Here an output between the two upper converters is arranged in station 4, which output can be connected to the transmission 2 through an isolator switch 45. In this way the converter 4 can co-operate with a fault free converter station through the isolator switch 41 and the line 1 and with a faulty station with the reduced voltage through the isolator switch 45 and the line 2. Here care must be taken that the isolator switch 45 does not become closed before the isolator switch 12 has been opened sufficiently for a short circuit of the upper converter in the station 4 to be avoided. The operation of the isolator switch 45 must therefore be made dependent on a certain voltage over the isolator switch 12 at the same time that the switch 45 can be prepared for operation by means of the auxiliary contact 33".

If a by-passing occurs in the station 4, it is this station which is to be switched over from the line 1 to line 2. In this case it is the isolator switch 41 which in its opening movement orders the opening of the isolator switch 12. In order to clarify this in FIG. 2 the contact 31' has been parallel connected with a contact 41' which has been arranged to be closed when the isolator switch 41 is opened.

In order to secure the extinguishing of the arc in the isolator switches 31 and 12, these have been series connected with the relays 31" and 12". If an arc still exists when one of said isolator switches has been fully opened, orders will be given by means of said relay to the current regulators of the converter stations to produce reduction of the transmission current until the arcs in the said isolator switches have been extinguished. When this has been carried out, the signal from said relay ceases and the stations can increase their currents up to the normal value.

What is claimed is:

1. D.C. transmission system, comprising at least first and second parallel-working converter stations and at least two parallel transmission lines, each having a return connection, at least the first converter station comprising a plurality of converters connected in series on their D.C. sides and each provided with a by-pass connecting means; normally closed switch means parallel-connecting said parallel transmission lines; connecting means between each of said converter stations and each of said transmission lines including means connecting all said stations to a first of said transmission lines in normal operation; means operatively connecting the by-pass connecting means in the first station to the connecting means between said first station and each of the transmission lines and to said switch means between said transmission lines, and means responsive to closing of a by-pass connecting means to open the connecting means between said first transmission line and said first station, to close the connecting means between the second transmission line and said first station and to open said switch means between said two transmission lines.

References Cited

UNITED STATES PATENTS

| | | | |
|---|---|---|---|
| 1,551,346 | 8/1925 | Troger | 307—20 X |
| 2,845,591 | 7/1958 | Albrecht et al. | 307—82 X |
| 3,214,639 | 10/1965 | Cabanes et al. | 317—26 X |
| 3,223,892 | 12/1965 | Dortort | 317—26 X |

ROBERT K. SCHAEFER, Primary Examiner

T. B. JOIKE, Assistant Examiner

U.S. Cl. X.R.

307—82, 86; 321—11, 27